June 8, 1948.     T. A. NEWKIRK     2,442,776
RADIO FREQUENCY CHOKE COIL
Filed Nov. 8, 1944

INVENTOR.
THOMAS A. NEWKIRK
BY William D. Hall
ATTORNEY

Patented June 8, 1948

2,442,776

UNITED STATES PATENT OFFICE 2,442,776

RADIO-FREQUENCY CHOKE COIL

Thomas A. Newkirk, Fairfield, Ohio

Application November 8, 1944, Serial No. 562,541

2 Claims. (Cl. 175—359)

(Granted under the act of March 3, 1883, as amended April 30, 1928; 370 O. G. 757)

The invention described herein may be manufactured and used by or for the Government for governmental purposes, without the payment to me of any royalty thereon.

The invention to be hereinafter described relates to radio frequency choke coils.

It is widely known that none of the various types of choke coils in use are capable of giving a smooth choking action or of offering a high impedance over a wide frequency range. Among the choke coils in general use are types spirally wound of the same continuous diameter capable of use over a very limited range or band only, and those of the pie-section construction in which a series of coils are spaced along a common axis. This pie-section type has the well known defect of pronounced irregularity of impedance, the impedance offered varying from a maximum to a minimum, which minimum is below that essential for satisfactory performance.

The main objects of the present invention are to eliminate or greatly minimize the above and other objections and deficiencies and provide a simple, efficient, and compact choke coil capable of low cost quantity production and easy, quick assembly.

In order to more clearly disclose the construction, operation and use of the invention reference should be had to the accompanying drawings forming part of the present application. Throughout the several figures of the drawings like reference characters designate the same parts.

Figure 1:
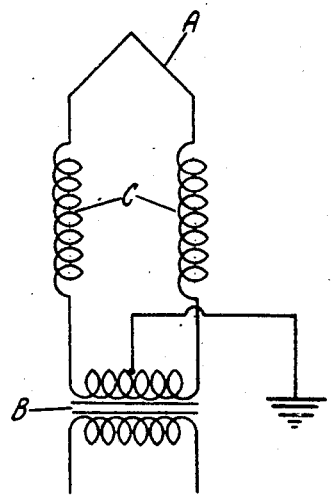
Fig. 1 is a diagrammatic view indicating location of the invention in one use.

It will be noticed that the conductor of this coil is a heavy gauge copper or magnet wire such as, for instance, 10 gauge or more. Wire of such dimensions, when wound into coil form is substantially self-supporting. In all uses in which the current is one of high amperage, the above relatively heavy gauge wire is acceptable. On the other hand, where the amperage is low, a much lighter gauge wire may be used. However, such lighter gauge wires, similarly wound, frequently are not self-supporting. For those which are not self-supporting a suitable form or foundation may be provided, or any one of a number of supporting brackets or the like. None are shown as they are all well known and their illustrations or further descriptions would only add to the bulk of the case without making it any more definite.

In all cases, a determining factor in the length of the winding or coil is the range of frequency over which the particular choke coil is to be designed to be effective, as will be well understood by those skilled in the art. Likewise, the minimum gauge of the conductor or wire will be determined, in well known manner, by the current the wire is to carry. These gauges or wire sizes are given in the various standard copper wire tables.

One important defect overcome by the present invention is that in present practice a choke coil which will perform satisfactorily at approximately a given frequency or narrow band of frequencies, may not perform with equal satisfaction throughout a wide band of frequencies. Accordingly, under present practice, it is necessary to use various choke coils, according to the frequencies of the current used, requiring a plurality of different choke coils.

Due to the structure of the present choke coil, eliminating or minimizing the discontinuities in all pie-section type choke coils, a single choke coil will perform satisfactorily over the whole of a wide band of frequencies for which it has been designed and which, otherwise, would require several choke coils.

As is well known, the spaces between adjacent helices of a coil, together with the adjacent helices, constitute, in effect, a condenser. Thus the plurality of helices and intervening air spaces have the effect of a corresponding number of condensers. This disposition controls the distributive capacity and the voltage breakdown of the respective coil, as will be well understood. Accordingly, variations of that spacing will have the same effect on regulation of the distributive capacity of the coil as though a variable condenser were used and similarly varied.

As is well understood, a small diameter coil of relatively large diameter wire corresponding to a gauge number of 10 or higher (diameter decreases as gauge number increases, as is well understood), with coils properly spaced, will perform satisfactorily at high radio frequency voltages and a larger diameter coil of similar gauge, with appropriate spacing, will perform satisfactorily at low frequencies. Neither will perform satisfactorily at the frequencies for which the other is designed.

It hardly need be mentioned that the successive helices must be insulated from each other. Air insulation is, of course, ample where practical. Where that is not thoroughly practical, any other suitable insulation may be used. Among these are various well known cements. While the 10 gauge wire will be self-supporting in coil form, it will be considerably braced or stiffened and damped against vibrations by the application of an adequate coat of properly selected cement. Vibration, obviously, varies the distances between helices and, though to a less extent, the diameters of helices, with resulting deterioration of the performance of the coil, as a whole. Accordingly, the cement performs an added important function and coils so coated have greatly increased rigidity and better performance.

In most uses of such choke coils, especially where high radio frequency voltages are developed in the circuit to which the choke is connected, it is essential that the coil connected at the hot end have helices of relatively small diameter and that they be relatively widely spaced. On the other hand, where a wide band of radio frequency voltages is involved, a coil having correspondingly larger diameter helices, respectively more closely spaced, will perform satisfactorily connected to the hot end. In such a wide band the range of voltages is gradual from high to low.

Prior to the present invention there has been no single choke coil known to applicant capable of satisfactory performance over the whole of a given wide band of radio frequency voltages.

Figure 2:
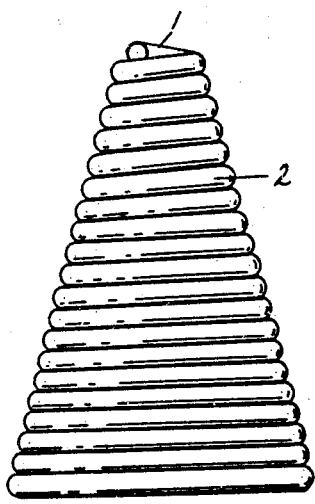
Fig. 2 is a side elevation of the coil before spacing.
Figure 3:
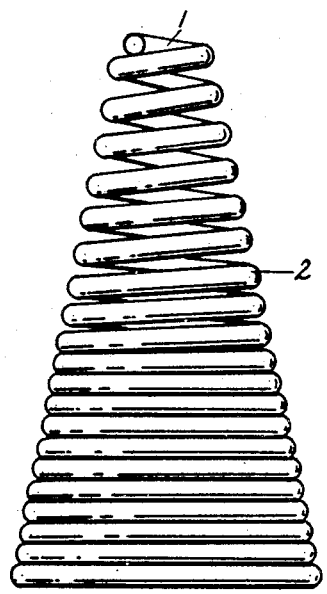
Fig. 3 is a like view of the finished coil.
Figure 4:
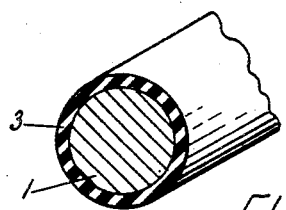
Fig. 4 is an enlarged cross section through the wire of the illustrated coil.

As an illustration of the invention, the coil may comprise a copper or magnet wire 1 of 10 gauge or more. This wire is first wound on any suitable conical form to provide a hollow cone such as shown in Fig. 2. The successive helices 2 will be in contact or approximately in contact. They increase in diameter from minimum to maximum diameter, gradually regularly and at approximately the same rate.

In order to separate or space the respective helices longitudinally of the coil, a pointed rod of any suitable material and having a diameter at least equal to the greatest desired final distance between helices may be used. When the coil has been wound on the form and removed, this rod may be forced between the first two helices until they are sufficiently separated. Due to the small diameter of helix at this point there is little tendency of it to return to its former position. Maintaining the rod in this relative position between helices, it is moved the full length of the coil, correspondingly spreading the successive helices. However, as the helices increase in diameter the resilient or spring action correspondingly increases. That, in turn, correspondingly, progressively decreases the spacing between helices after separation. Thus, at the greatest diameter, the spaces between helices is minimum, increasing to maximum at the smallest diameter.

After the coil has been formed and the helices separated, it is coated, in any suitable way with any one of a number of well known insulating cements 3. When dried, this cement adds greatly to the stiffness, rigidity and self-supporting ability of the coil. That, of course, acts to vary materially dampen, isolate or absorb vibrations.

With lighter gauge wire the coils may be wound on forms which have surfaces spirally grooved to the desired pitch, the wire seating in the groove according to the desired final disposition. The form is then removed, leaving the coil, or a permanent form or bracket may be used and the final coil wound thereon. Various ways may be followed for coiling as well as for spacing the helices of the coils, it being well understood that this invention is not dependent on any given method of winding or of spacing.

A choke coil made in accordance with this invention comprises helices of minimum diameter and maximum spacing progressively changing to maximum diameter and minimum spacing, the change being gradual, progressive and approximately regular throughout the length of the coil.

A coil of this invention may be used with thoroughly satisfactory performance over the whole of a greatly increased band of radio frequencies, relatively to the range of use of known choke coils. Throughout that greater band its performance will be smooth, regular and continuous from the highest to the lowest of the band, inclusive.

In the simple diagram shown, as one of many uses, A may indicate a tube filament, B a transformer, and C the location of the choke coil of this invention in the particular diagram.

It is thought that the construction, operation and use of the invention will be clear from the preceding detailed description.

It will be well understood that the illustration is purely by way of example and that many variations may be resorted to within the scope of the appended claims without departing from the field of the invention, and it is meant to include all such within this application.

Having thus described my invention, what I claim and desire to protect by Letters Patent is:

1. A radio frequency choke coil comprising a continuous conductor wound in spiral and conical form, every helix thereof being longitudinally spaced from all adjacent helices, the helices thereof progressively increasing gradually and regularly in diameter from one end to the other and the longitudinal spacing between successive helices thereof decreasing gradually and regularly in the same direction.

2. A radio frequency choke coil comprising a continuous conductor wound in spiral and conical form, every helix thereof being longitudinally spaced from all adjacent helices, the helices thereof progressively increasing gradually and regularly in diameter from one end to the other and the longitudinal spacing between successive helices thereof decreasing gradually and regularly in the same direction, said coil being provided with a complete and continuous enclosing insulating and stiffening layer.

THOMAS A. NEWKIRK.

REFERENCES CITED

The following references are of record in the file of this patent:

UNITED STATES PATENTS

| Number | Name | Date |
|---|---|---|
| 1,132,281 | Moody | Mar. 16, 1915 |
| 1,133,441 | Lorenz | Mar. 30, 1915 |
| 1,372,850 | Turney | Mar. 29, 1921 |
| 1,816,448 | Terman | July 28, 1931 |
| 1,839,802 | Northrup | Jan. 5, 1932 |
| 2,163,644 | Ware | June 27, 1939 |
| 2,249,909 | Pisarev | July 22, 1941 |
| 2,351,604 | Ferrill | June 20, 1944 |
| 2,378,890 | Abe et al. | June 26, 1945 |

FOREIGN PATENTS

| Number | Country | Date |
|---|---|---|
| 95,626 | Austria | Jan. 10, 1924 |